(12) United States Patent
Morrison et al.

(10) Patent No.: US 7,213,175 B2
(45) Date of Patent: May 1, 2007

(54) METHODS AND SYSTEMS FOR MANAGING AN APPLICATION'S RELATIONSHIP TO ITS RUN-TIME ENVIRONMENT

(75) Inventors: Conor P. Morrison, Seattle, WA (US); Sivaprasad V. Padisetty, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 833 days.

(21) Appl. No.: 10/043,364

(22) Filed: Jan. 9, 2002

(65) Prior Publication Data

US 2003/0167422 A1 Sep. 4, 2003

(51) Int. Cl.
*G06F 11/00* (2006.01)
(52) U.S. Cl. .................... 714/38; 717/124; 719/320
(58) Field of Classification Search ................. 714/33, 714/38, 46, 100; 717/114, 126, 125, 133, 717/108, 116, 123, 124; 719/310, 320
See application file for complete search history.

(56) References Cited

U.S. PATENT DOCUMENTS

| | | | |
|---|---|---|---|
| 5,421,004 A | | 5/1995 | Carpenter et al. |
| 5,544,316 A | | 8/1996 | Carpenter et al. |
| 5,604,907 A | | 2/1997 | Conner et al. |
| 5,623,657 A | | 4/1997 | Conner et al. |
| 5,745,767 A | * | 4/1998 | Rosen et al. ................. 717/124 |
| 5,784,553 A | * | 7/1998 | Kolawa et al. ............... 714/38 |
| 5,903,718 A | * | 5/1999 | Marik .......................... 714/38 |
| 6,067,639 A | | 5/2000 | Rodrigues et al. |
| 6,138,252 A | * | 10/2000 | Whitten et al. ............... 714/46 |
| 6,154,876 A | * | 11/2000 | Haley et al. ................. 717/133 |
| 6,192,419 B1 | | 2/2001 | Aditham et al. |
| 6,216,149 B1 | | 4/2001 | Conner et al. |
| 6,233,727 B1 | * | 5/2001 | Nagasuka et al. ........... 717/114 |
| 6,405,360 B1 | | 6/2002 | Bohrer et al. |
| 6,408,403 B1 | | 6/2002 | Rodrigues et al. |
| 6,550,057 B1 | * | 4/2003 | Bowman-Amuah ......... 717/126 |
| 6,698,012 B1 | * | 2/2004 | Kossatchev et al. ........ 717/126 |
| 6,718,535 B1 | * | 4/2004 | Underwood ................. 717/101 |
| 6,754,850 B2 | * | 6/2004 | Grey et al. .................... 714/33 |
| 6,775,824 B1 | * | 8/2004 | Osborne et al. ............. 717/125 |

OTHER PUBLICATIONS

Cangussu et al. "A state model for the software test process with automated parameter identification" 2001 IEEE, pp. 706-711.*

* cited by examiner

*Primary Examiner*—Van H. Nguyen
(74) *Attorney, Agent, or Firm*—Christensen O'Connor Johnson Kindness PLLC

(57) ABSTRACT

Disclosed are a framework for managing an application's relationship to its run-time environment and an engine that accepts the framework as input and runs the application within the environment. Aspects of the framework and engine may be changed to suit a changing environment without changing the application itself. By managing details of the environment, the invention leaves developers free to focus on the specific tasks of the application. The framework also allows the engine to provide standardized services such as deadlock and leak detection, progress monitoring, and results logging. As an example, the application may be a software test suite. The invention allows the test suite to be run single- or multi-threaded and with individual tests within the suite running consecutively or concurrently. The invention can be parameterized to accommodate different testing goals, such as basic variation testing, regression testing, and stress testing, without changing the test suite itself.

17 Claims, 13 Drawing Sheets

FIG. 7a

| Sub-application Data Structure 700: |
|---|
| lpGlobalData 702 |
| lpThreadData 704 |
| lpThreadData1 706 |
| szPrefix 708 |
| dwIndex 710 |
| dwCurrentInnerLoopCount 712 |
| dwCurrentSub-applicationCount 714 |

FIG. 7b

| Global Data Class 716: | |
|---|---|
| dwCurrentLoopCount 718 | dwReturnCount 742 |
| bClean 720 | dwLogLevel 744 |
| bCheck 722 | dwLogFlags 746 |
| bPerf 724 | pszClusterName 748 |
| bCatchUnhandledExceptions 726 | szComputerName 750 |
| dwPID 728 | pszServer 752 |
| dwLoopCount 730 | szIncludedDebugErrors 754 |
| dwInnerLoopCount 732 | pszFatalErrors 756 |
| dwSub-applicationCount 734 | pUserData 758 |
| dwThreadsPerUnit 736 | pSharedInfo 760 |
| dwParallelCount 738 | pGlobalSharedData 762 |
| dwBreakAction 740 | |

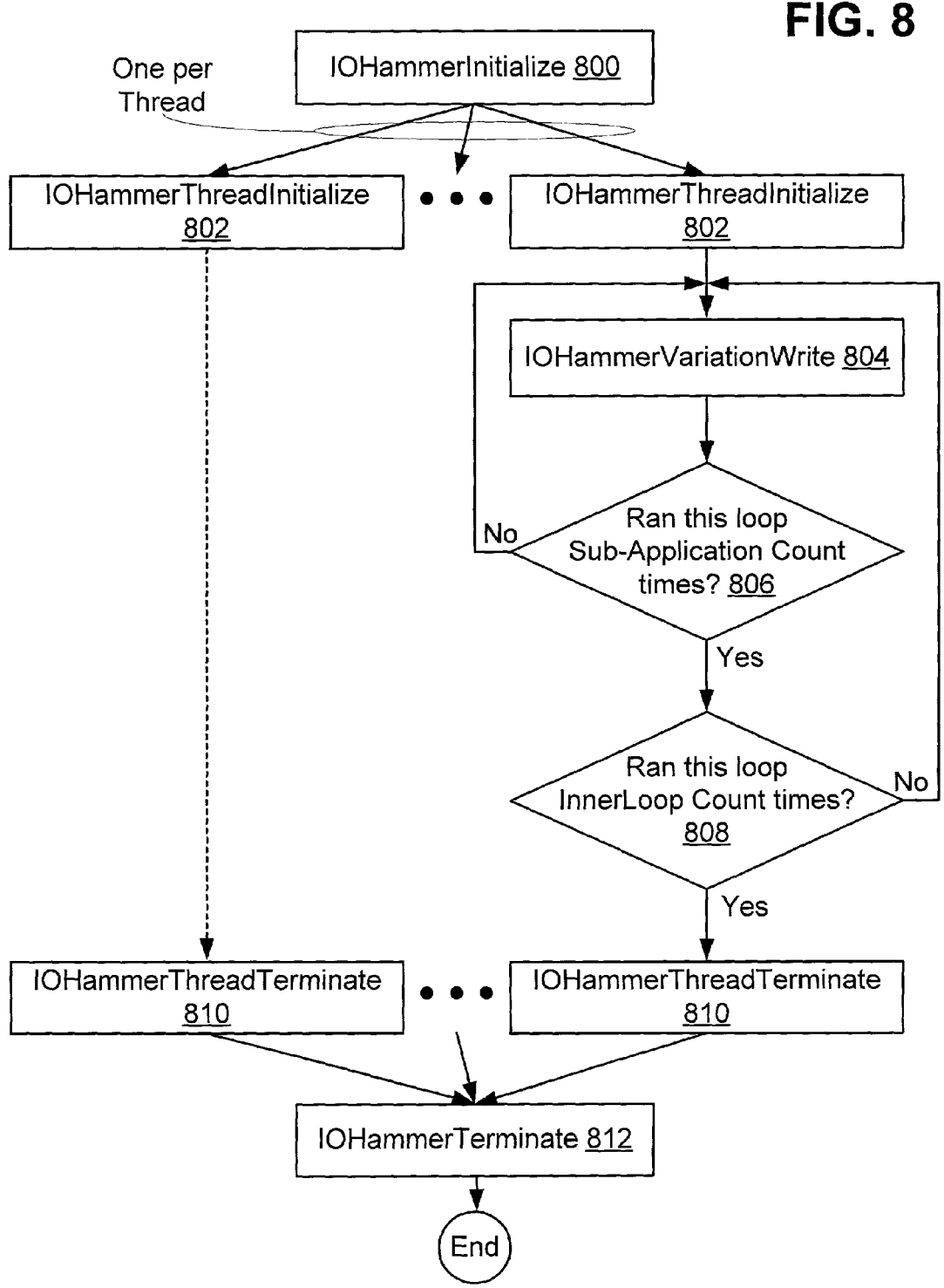

METHODS AND SYSTEMS FOR MANAGING AN APPLICATION'S RELATIONSHIP TO ITS RUN-TIME ENVIRONMENT

TECHNICAL FIELD

The present invention relates generally to running software applications, and, more particularly, to an application's relationship to its run-time environment.

BACKGROUND OF THE INVENTION

The relationship of a typical software application to its run-time environment is growing more complex for at least four interrelated reasons. First, environments are themselves growing more complex. The rise of telecommunications often allows an application to take advantage of, or requires an application to be aware of, services and resources provided by remote computing devices located throughout the environment. Each remote device may present its own set of communications peculiarities, such as novel protocols or real-time response constraints. The number of possible interactions grows exponentially with the number of devices and applications involved in one computing task, and all of these interactions need to be managed efficiently. Second, environments may change their characteristics over time. For example, a given application may always need to secure a specific type of resource from a specific type of remote server, but the identities of the servers available to provide that type of resource may change moment by moment. At the same time, new services may be introduced and old services may disappear. Third, the application may need to run in multiple environments. The number of possible environments is proliferating as, for example, hardware and software platforms are optimized for particular uses. Even if an application's relationship to any one environment were to remain unchanged (unlikely for the reasons discussed above), the growth in number and diversity of possible environments leads to a demand for an increase in the flexibility, and thus the complexity, of the application's environmental interactions. Compounding the well known difficulties of developing an application to meet diverse requirements of diverse environments, a new environment may arise whose requirements were unforeseen when the application was developed. Fourth, applications themselves are becoming increasingly complex. For example, an application that formerly ran as one thread on a single, stand-alone computing device may now be reconstituted to run as multiple, interacting threads on multiple devices spread throughout the globe and connected by telecommunications links. One application may need to serve multiple purposes and must be able to present itself accordingly, for instance by providing a variable range of services dependent upon the sophistication of its current users. (In this situation, the requirements of the application's users are considered to be part of the application's environment.) As can be appreciated, these four reasons act in concert, the effects of each contributing, often in unpredictable ways, to the magnitude of the effects of the others.

As an especially pointed example of this situation, consider the case of an application designed to test other applications. (To differentiate between the application doing the testing and the application being tested, the former will be called the "test system" while the latter will be called the "application under test.") The four reasons given above for increased complexity apply here to a heightened extent because the reasons may apply both to the relationship of the application under test to its run-time environment (its run-time environment including the test system) and to the relationship of the test system to its own run-time environment. As one example, to thoroughly exercise the application under test, the test system should exercise all aspects of the application under test's environmental interactions, through a range of possible environments and as those environments change. For any given environment, the test system may need to call upon different aspects of the application under test for different types of testing, such as basic variation testing, regression testing, and stress testing. This may require that the test system run multiple copies of the application under test at the same time, and each copy may be performing multiple tasks simultaneously. While the test system is coordinating all of these activities of the application under test, the test system still needs to handle its own complex interactions with its own environment, such as reporting test results, trapping execution errors, and detecting other potentially harmful aspects of the application under test's environmental relationship (such as dead locks and memory leaks). It is clear from this example that developing an application in the face of multiple, changing environments can be very challenging, and that the challenges are heightened when developing a test system.

Developers often address complexity in their application's relationships by designing aspects of the application that can be configured to meet changing circumstances. An application's configuration parameters can then be set when the application is run (or when it is compiled). Different sets of configurable parameters are set to reflect different aspects of the application's relationship to its run-time environment. Of course, when building flexibility into an application by means of configurable parameters, the developer predicts the range of needs in the possible set of run-time environments so that the configurable parameters, and the application's response to them, can be set.

Useful as configurable parameters are, it can still be extremely difficult to correctly initialize all of these parameters in a complex application's configuration. Subtle errors may arise from mismatches between one part of an application and other parts of the same application, or between the application and other applications in its environment. Mismatches include unexpected events, unplanned for sequences of events, data values outside the range of normalcy, updated behavior of one application not matched by updates in its peers, etc. Difficult as configuration is for one application, it is exponentially more difficult to configure multiple applications (such as the combination of a test system and an application under test) so that they interact with their environments and with each other in a predictable fashion. Adding to the difficulty of creating correct configurations, a configuration may change with time. Applications may be used in an environment, such as a testing environment, in which their configurations may be changed every time they operate. An application may need to run in an environment whose parameters are beyond the range envisaged by the application's developer and so beyond the range of its configurable parameters. In addition to these considerations, it is not desirable for an application developer to devote too much time to configuration issues: they distract the developer from working on issues at the core of the application and they may require environmental expertise foreign to the developer. Indeed, the expertise needed to correctly develop an application's configurable relationships may exist in no one person.

Developing an application's flexibility so that the application can respond correctly regardless of the environments within which it must run and then managing that flexibility in the face of multiple, changing environments are becoming increasingly burdensome. There is a need to contain the burgeoning complexity of an application's relationship to its run-time environment and to separate relationship issues from core application issues.

SUMMARY OF THE INVENTION

In view of the foregoing, the present invention provides a framework for managing an application's relationship to its run-time environment and an engine that accepts the framework as input and runs the application within the environment. Aspects of the framework and of the engine may be changed to suit a changing environment without changing the application itself. By managing details of the application's relationship to its environment, the invention leaves application developers free to focus on the specific tasks of the application. Standard methods for providing services and resources allow some aspects of application development to become standardized. Standard interfaces to, for example, error trapping, progress tracking, and resource use and abuse reporting are developed for use by any application.

As an example, the application may be a software test suite. The invention allows the test suite to be run single- or multi-threaded and with individual tests within the suite running consecutively or concurrently, all without altering the underlying tests. The framework and engine are parameterized to accommodate different testing goals, such as basic variation testing, regression testing, and stress testing, without changing the test suite itself. For any application being tested by the test suite, the engine provides deadlock and leak detection, progress monitoring, and results logging.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 7a is a data structure diagram showing the argument passed to the functions run in FIGS. 6a, 6b, 6c, and 6d; FIG. 7b is a data class diagram showing variables used when running these functions; and FIG. 8 is similar to FIGS. 3a and 3b but has been particularized to show the functions of the IOHammer Test Suite example.

DETAILED DESCRIPTION OF THE INVENTION

Figure 1:
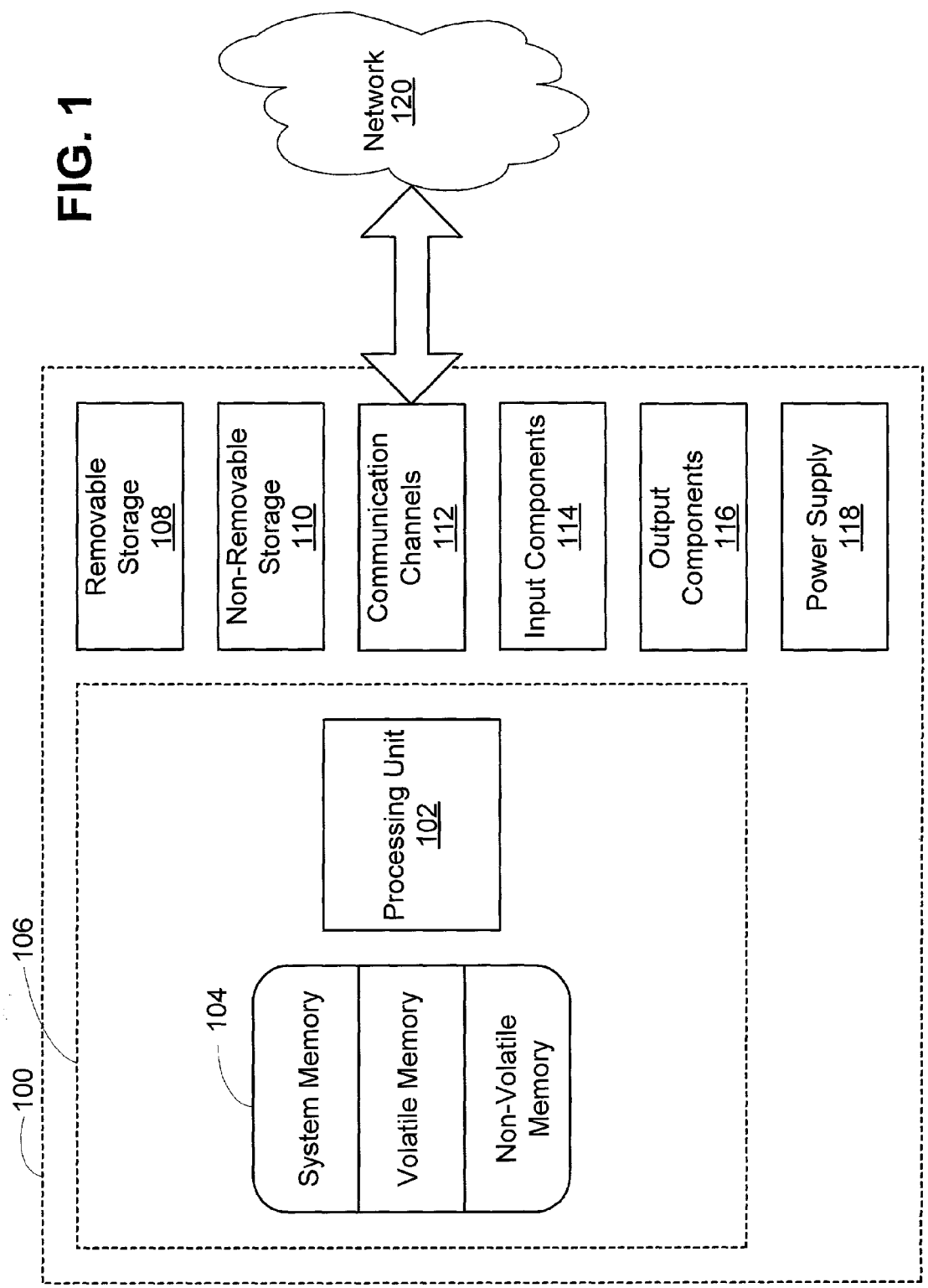
FIG. 1 is a block diagram generally illustrating an exemplary computing system environment that supports the present invention.

Turning to the drawings, wherein like reference numerals refer to like elements, the invention is illustrated as being implemented in a suitable computing environment. The following description is based on embodiments of the invention and should not be taken as limiting the invention with regard to alternative embodiments that are not explicitly described herein. Section I presents an exemplary computing environment in which the invention may run. Section II describes exemplary embodiments of the invention's framework and engine, showing their structures and operations. To better illustrate the concepts presented in Section II, Section III presents the details of an actual application, the IOHammer Test Suite, developed for use with the invention.

I. An Exemplary Computing Environment

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Referring to FIG. 1, the present invention may reside in a computing device with any of many different computer architectures. For description purposes, FIG. 1 shows a schematic diagram of an exemplary computer architecture usable for these devices. The architecture portrayed is only one example of a suitable environment and is not intended to suggest any limitation as to the scope of use or functionality of the invention. Neither should the computing devices be interpreted as having any dependency or requirement relating to any one or combination of components illustrated in FIG. 1. The invention is operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing device typically includes at least one processing unit 102 and memory 104. The memory 104 may be volatile (such as RAM), non-volatile (such as ROM, flash memory, etc.), or some combination of the two. This most basic configuration is illustrated in FIG. 1 by the dashed line 106. The devices may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks (DVD), other optical storage, magnetic cassettes, magnetic tape, magnetic disk storage, other magnetic storage devices, and any other media which can be used to store the desired information and which can be accessed by the computing device. These devices may also contain communication channels 112 that allow a device to communicate with other devices. Communication channels 112 are examples of communications media. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media, such as wired networks and direct-wired connections, and wireless media such as acoustic, radio, infrared, and other wireless media. The term computer-readable media as used herein includes both storage media and communications media. The devices may also have input components 114 such as a keyboard, mouse, pen, a voice-input component, a touch-input device, etc. Output components 116 include screen displays, speakers, printer, etc., and rendering modules (often called "adapters") for driving them. Each of the devices has a power supply 118. All these components are well know in the art and need not be discussed at length here.

II. The Framework and the Engine

The invention creates data structures and functions to form a consistent framework around an application, connecting the application to the application's run-time environment. Because this framework is created in a consistent manner for every application and with well defined properties, it allows the invention to provide to applications common support and management features that would otherwise have to be built into each application. These features enable an application, written once, to run without modification in different run-time environments, even in environments with characteristics unforeseen at the time the application was written.

Figure 2:
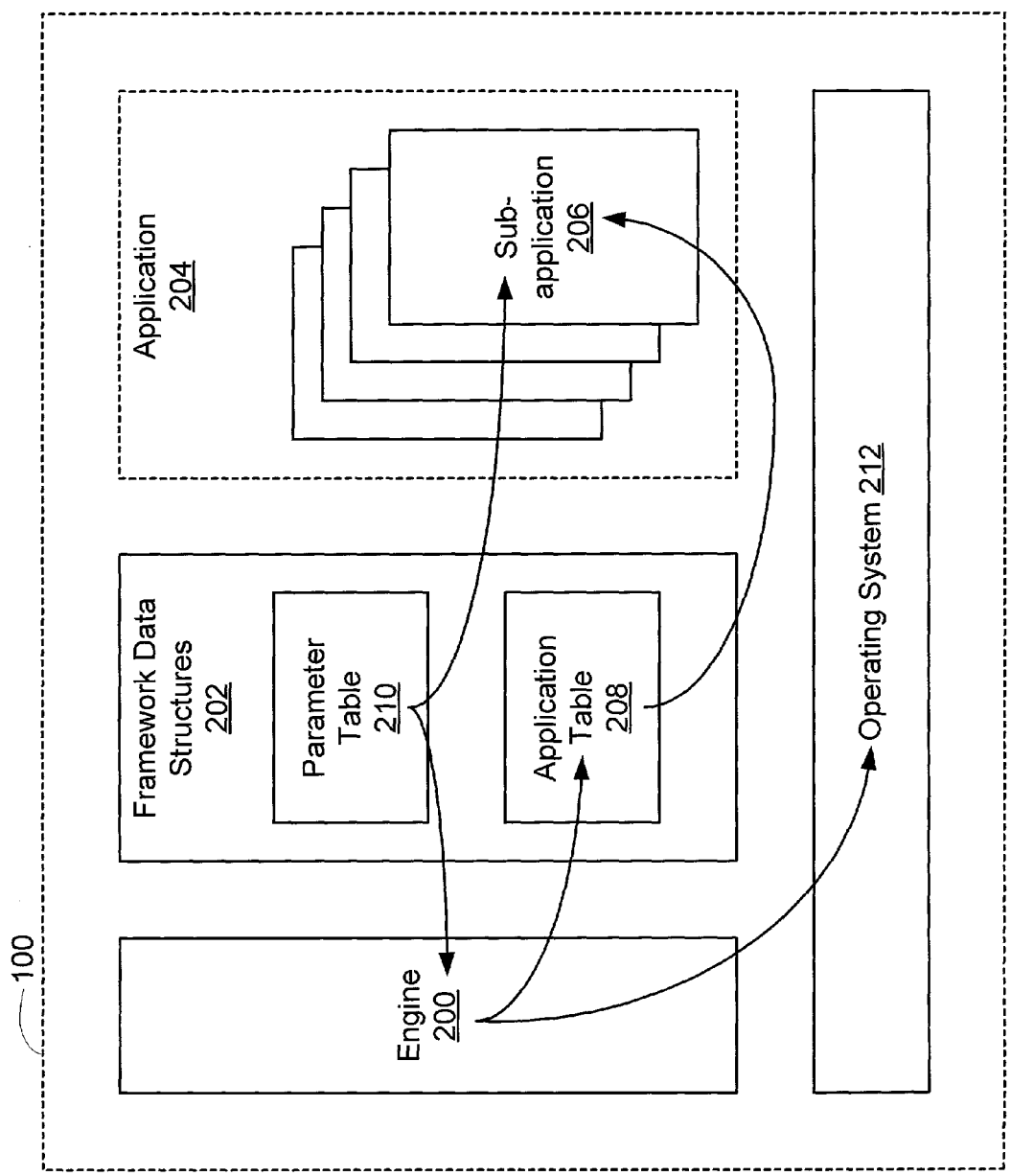
FIG. 2 is a block drawing showing how pieces of an exemplary embodiment of the invention fit together.

FIG. 2 shows how pieces of an exemplary embodiment of the invention fit together. The engine 200 uses the framework data structures 202 to run the application 204. The application may be an executable or, as in the case shown in FIG. 2, it may be a collection of related, executable sub-applications 206. As an example, expanded upon in Section III below, the application may be a suite of tests developed to exercise one feature of the computing environment 100 or one application under test (not shown). Each sub-application is then a particular test (called a "variation") in the suite.

The framework data structures 202 consist of two major parts, the application table 208 and the parameter table 210. The application table contains information about each sub-application and includes special functions created by the invention as part of the framework. The parameter table holds variables used by the engine 200 and by the sub-applications 206 when they run. These two tables are described further with reference to FIG. 4. In addition to these two main parts, the framework data structures include references to other framework functions created by the invention. The operating system 212 is shown to emphasize that the engine may use services provided by the operating system when running the sub-applications.

Figure 3A:
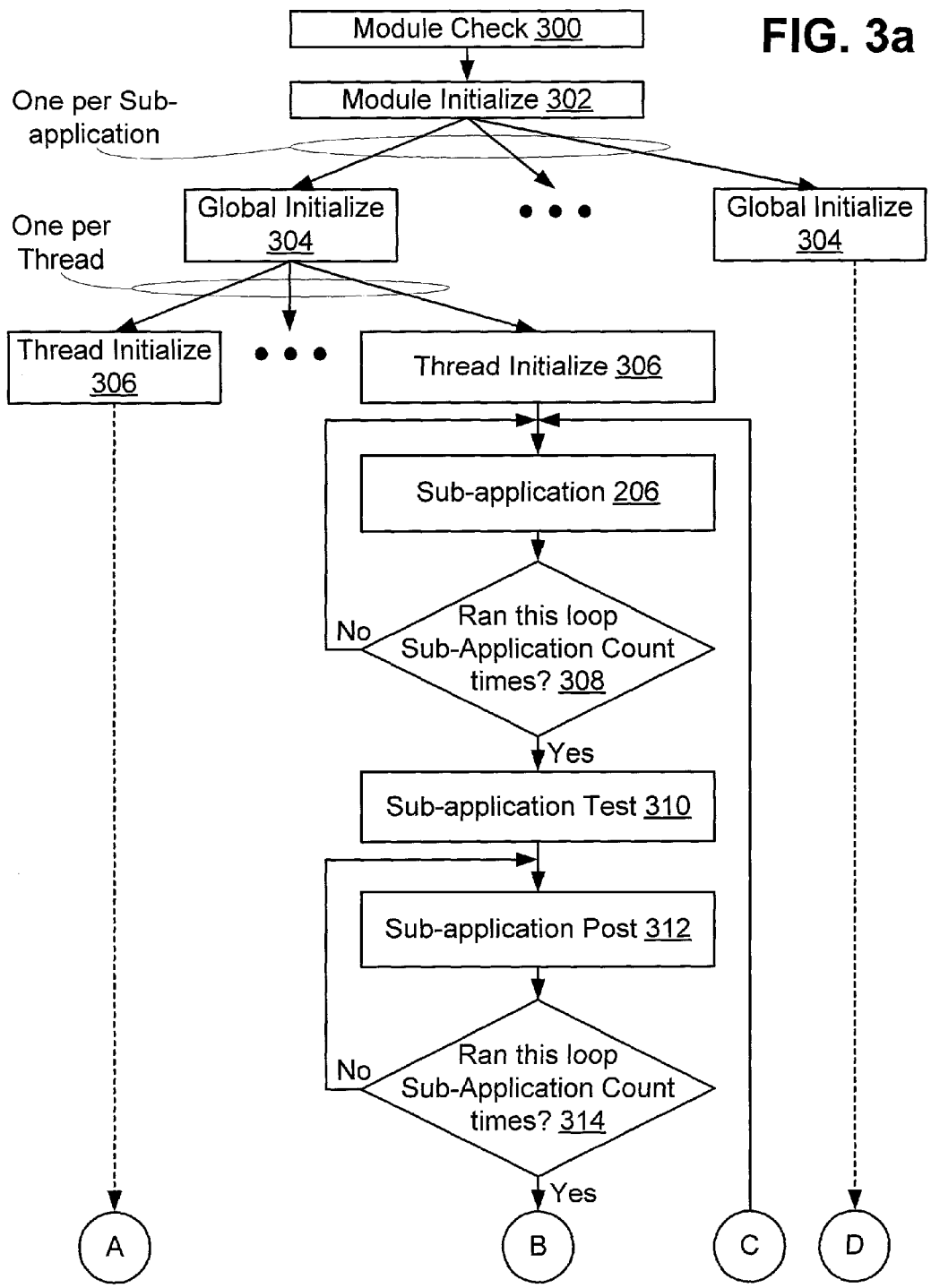
FIGS. 3a and 3b are a function-flow diagram showing an application's relationship to functions provided by the framework.
Figure 3B:
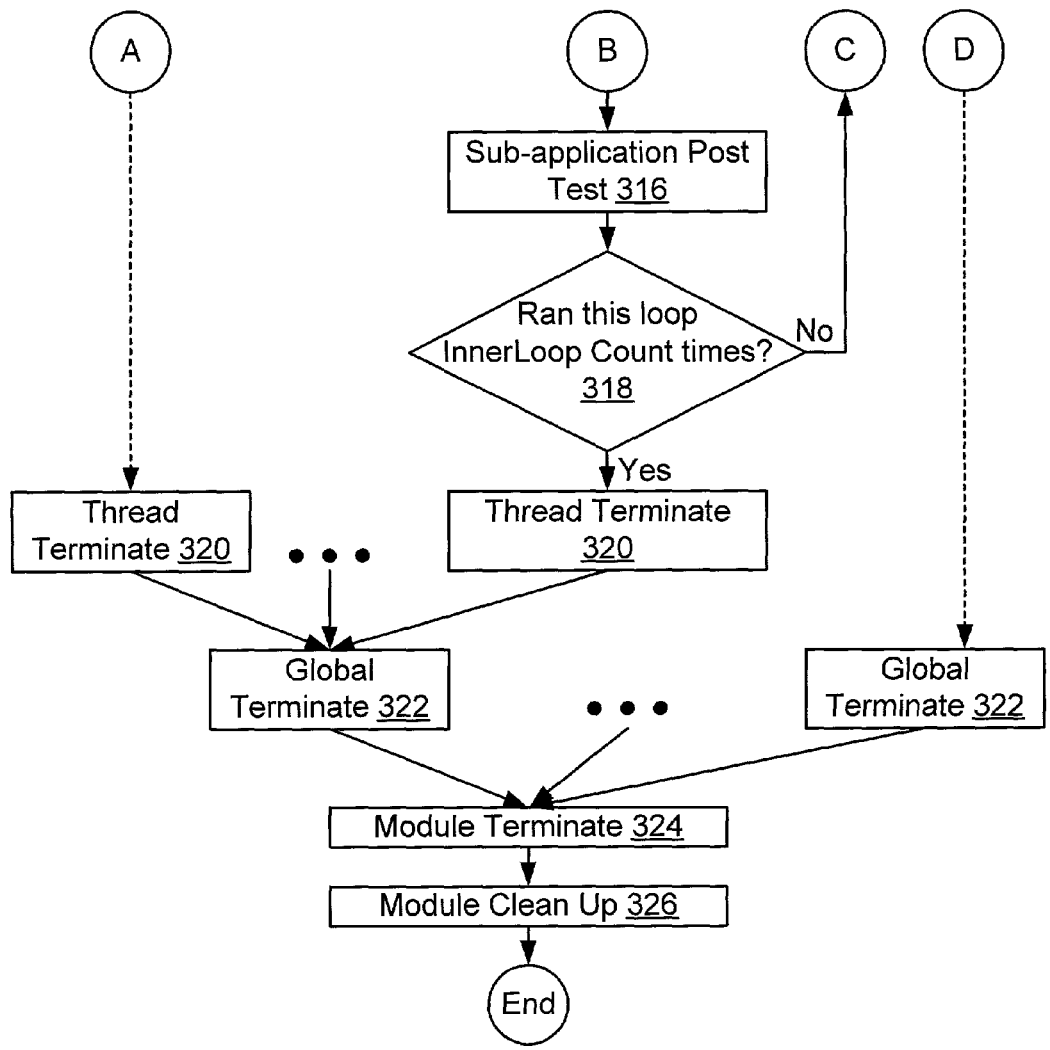

FIGS. 3a and 3b show the relationships among an application 204's sub-applications 206 and the framework functions created by the invention. These Figures are not meant to be a detailed flow chart (see FIGS. 6a, 6b, 6c, 6d and accompanying text, below), but are meant instead to introduce the functions. In the function names in FIGS. 3a and 3b, "module" refers to the application 204 (possibly consisting of a collection of sub-applications 206) and its related framework. The module check function 300 is a framework function that checks to see if the resources needed to run the application are available. If a needed resource is not available, then the engine might as well stop right there and report the problem. The module check function checks for all resources needed by any of the sub-applications 206. A module initialize function 302 (which may be incorporated with the module check function into one function) does whatever initialization is required across sub-applications, such as securing resources and initializing global variables that reflect the current run-time environment.

After the module-level checks and initialization, sub-applications 206 in the application 204 are run. Depending upon the application's requirements, these sub-applications may be run consecutively, concurrently, or in some combination of the two. For example, the application may be a test suite targeting a communications application. One sub-application may represent an originator of a communications session, a second sub-application may represent a peer communicating device, while a third sub-application performs the function of a protocol analyzer. These three sub-applications would be run concurrently. In any case, a global initialize function 304 is called to begin the processing of each sub-application. This function works on environmental variables at a level between the generality of the module initialize function 302 and the thread initialize function 306. This division of initialization into separate levels is one method employed by the invention to provide flexible, yet consistent, management of the run-time environment. Of course, if the application consists of only one sub-application, then the global initialize function may be merged into the module initialize function.

Sub-applications 206 may sometimes be run as multiple, concurrent threads. For example, the sub-application may be a variation in a test suite application 204. To regression test the features of an application under test, it may be sufficient to run the variation as a single thread. On the other hand, multiple, concurrent threads can be run to stress test the application under test. To capture the details inherent in running the sub-application as a variable number of threads, the invention provides a thread initialize function 306.

With the run-time environment set up, the invention runs the sub-application 206 itself. As it runs, the sub-application can call on the framework data structures 202 (discussed below with reference to FIGS. 4, 7a, and 7b) for information coming from its run-time environment. The framework data structures also contain information directing the engine 200 to run the sub-application multiple times, as shown in box 308. When that is complete, a sub-application test function 310 is provided to survey the work performed by the sub-application and report on what it finds. For each time that the sub-application is run in the box 308 loop, a sub-application post function 312 is run in the box 314 loop. This function cleans up changes wrought by the sub-application function, possibly freeing storage seized by the sub-application. A sub-application post test function 316 ensures that the sub-application-specific clean up is complete. Box 318 allows for the possibility that, for some special cases, often involving tests, the whole series of sub-application functions may be run multiple times.

The end of the process of running an application 204 mirrors the beginning. Each thread ends with a thread terminate function 320. Then each sub-application 206 ends with a global terminate function 322. Finally, the whole application ends with a module terminate function 324 and a module clean up function 326.

Note that the break down into the particular framework functions shown in FIGS. 3a and 3b is meant to be illustrative only. The services provided to the application by the framework can be provided in numerous other, equivalent ways. For some applications, or for some run-time environments encountered by an application, some of the functions illustrated may be combined, others may be eliminated. It should be noted, however, that the division of an application into a set of multiple functions (whether those shown in FIGS. 3a and 3b or some other set) is one way in which the invention separates environmental issues from issues more particular to the application itself. This division simplifies the task of writing the application so that, when run in the flexible framework of the functions shown in FIGS. 3a and 3b and the framework data structures 202, it can respond to varied and changing run-time environments without the necessity of changing itself.

Figure 4:
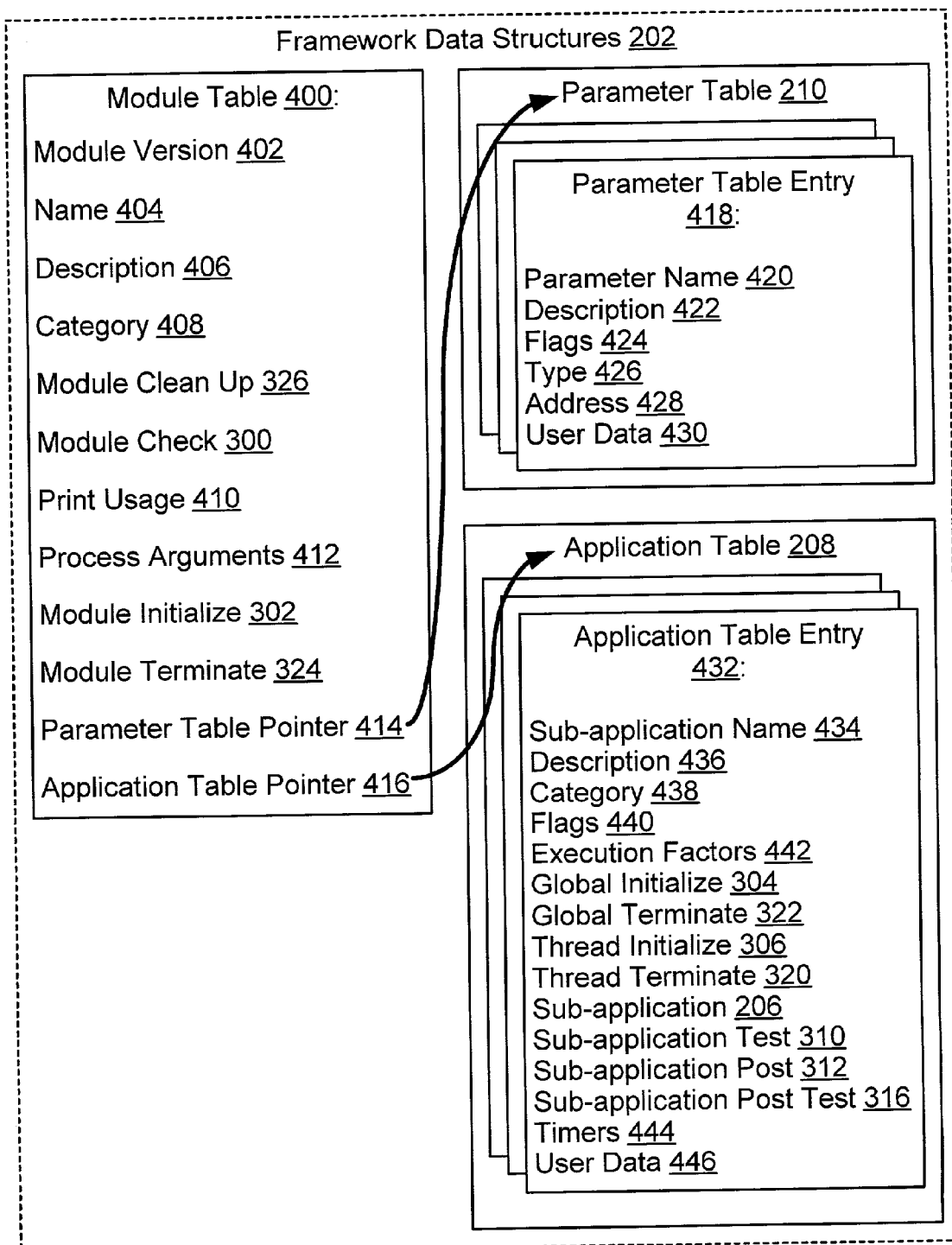
FIG. 4 is a data structure diagram showing the framework according to one embodiment of the invention.

FIG. 4 presents an example of the data fields that may make up the framework data structures 202. A module table 400 begins with three fields that distinguish this module from others: the module version 402, the module name 404, and a text description of the module 406. In some implementations, each module may specify a category 408 to which the application 204 belongs. For example, test suites may be categorized as "Basic Variation Tests," "Regression Tests," and "Stress Tests." This categorization could be useful to run all test suites of a certain type against an application under test.

Next come references to several of the framework functions discussed with reference to FIGS. 3a and 3b. A print usage function 410 might be provided to provide guidance to a user wanting to run the application 204 within this framework. The process arguments function 412 processes command line arguments and sets global variables accordingly. The last two entries shown are references (414 and 416) to the parameter table 210 and application table 208 of this module.

The parameter table 210 contains one entry 418 for each parameter that can be set and passed when the application 204 is run. Some of these parameters are defined by the application developer, others are standard for all applications. The standard parameters are described below with reference to steps 600, 602, 604, and 606 of FIG. 6a. Each parameter table entry contains a parameter name 420 and a description 422. Next comes a field of flags 424, indicating, for example, whether the parameter is mandatory. The data type of the parameter is indicated in field 426 and the address where its value is stored is given in field 428. Any data of the user's choice may be stored in the final field 430.

The application table 208 contains an entry 432 for each sub-application 206. After identifying the sub-application by name 434, description 436, and category 438, a flags field 440 specifies run-time characteristics such as whether this sub-application is enabled to be run and whether it should run in a separate thread. The execution factors field 442 contain values that are multiplied by loop counter parameters set by the user to arrive at the actual number of times a loop is performed. For example, if the user sets the sub-application count parameter (discussed below with reference to step 604 of FIG. 6a) to three and the corresponding execution factor is two, then the loops controlled by boxes 308 and 314 will each be performed six times. Normally the execution factors are all set to one.

The following fields refer to framework functions discussed with reference to FIGS. 3a and 3b. The timers field 444 specifies a minimum (usually set to zero) and maximum time to wait before running the sub-application 206. A user data field 446 allows the storage of any data at the choice of the user.

Figure 5:
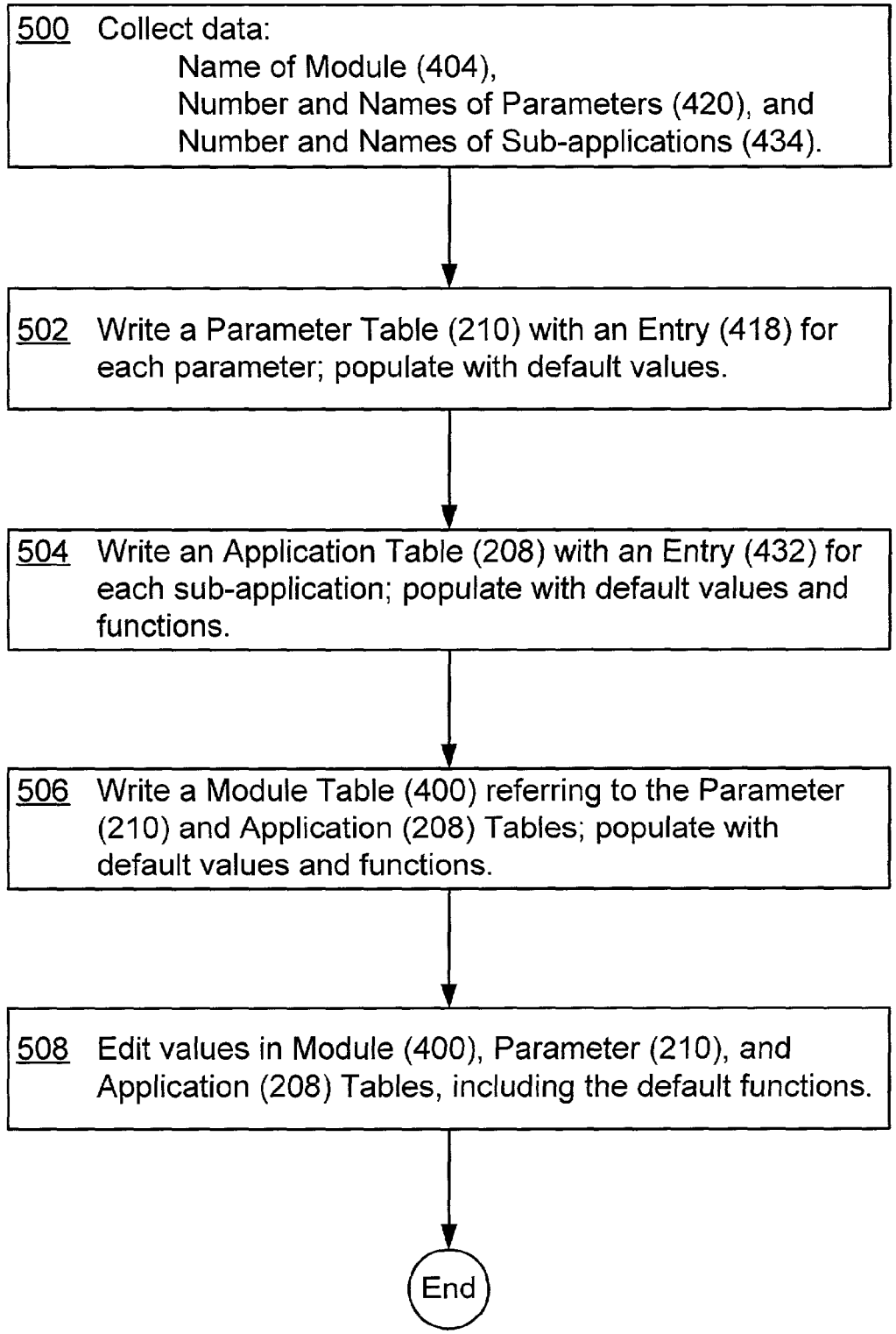
FIG. 5 is a flow chart showing one way to populate the framework data structures of FIG. 4.

FIG. 5 shows an example of how the framework encapsulating an application 204 can be built. In step 500, the user begins the creation process by naming the application and specifying the number and names of the parameters 420 and the number and names of the sub-applications 434. For example, the command:

wttautogen.exe SPfail -p:2 SpsrvPort CrashTypeFlag -v:2 Crash Restart generates a framework for an application named SPfail with two parameters SpsrvPort and CrashTypeFlag. The SPfail application contains the two sub-applications Crash and Restart. The command next prompts the user to specify the data types of the parameters. The command then begins to automatically create the framework functions and populate the framework data structures 202.

In step 502, the command creates a parameter table 210 with an entry 418 for SpsrvPort and one for CrashTypeFlag. Because the command knows nothing of these parameters beyond their data types, it populates the parameter table entries with default values. In a similar manner, the command creates in step 504 an application table 208 with an entry 432 for the Crash sub-application and one for Restart.

The command creates a module table 400 that refers to the parameter table 210 and the application table 208 in step 506. It too is populated with default values. The default values for the module table and for the application table include default framework functions. For example, a thread initialize function 306 specific to the Crash sub-application 206 within the SPfail application 204 is put into Crash's application table entry 432.

At this point, a framework has been created, but it reflects very little of the what the application developer had in mind for his application 204. The development work is mostly concentrated into step 508. There, the developer edits the created framework functions and data structures to match his conception of the application. He may, for example, choose to leave some framework functions unaltered, but would certainly flesh out the default sub-application functions 206. The present invention does not remove the development of the application from the developer. Rather, it provides a framework that encapsulates the application and removes from the developer much of the burden of dealing with variability in the application's run-time environment.

Figure 6A:
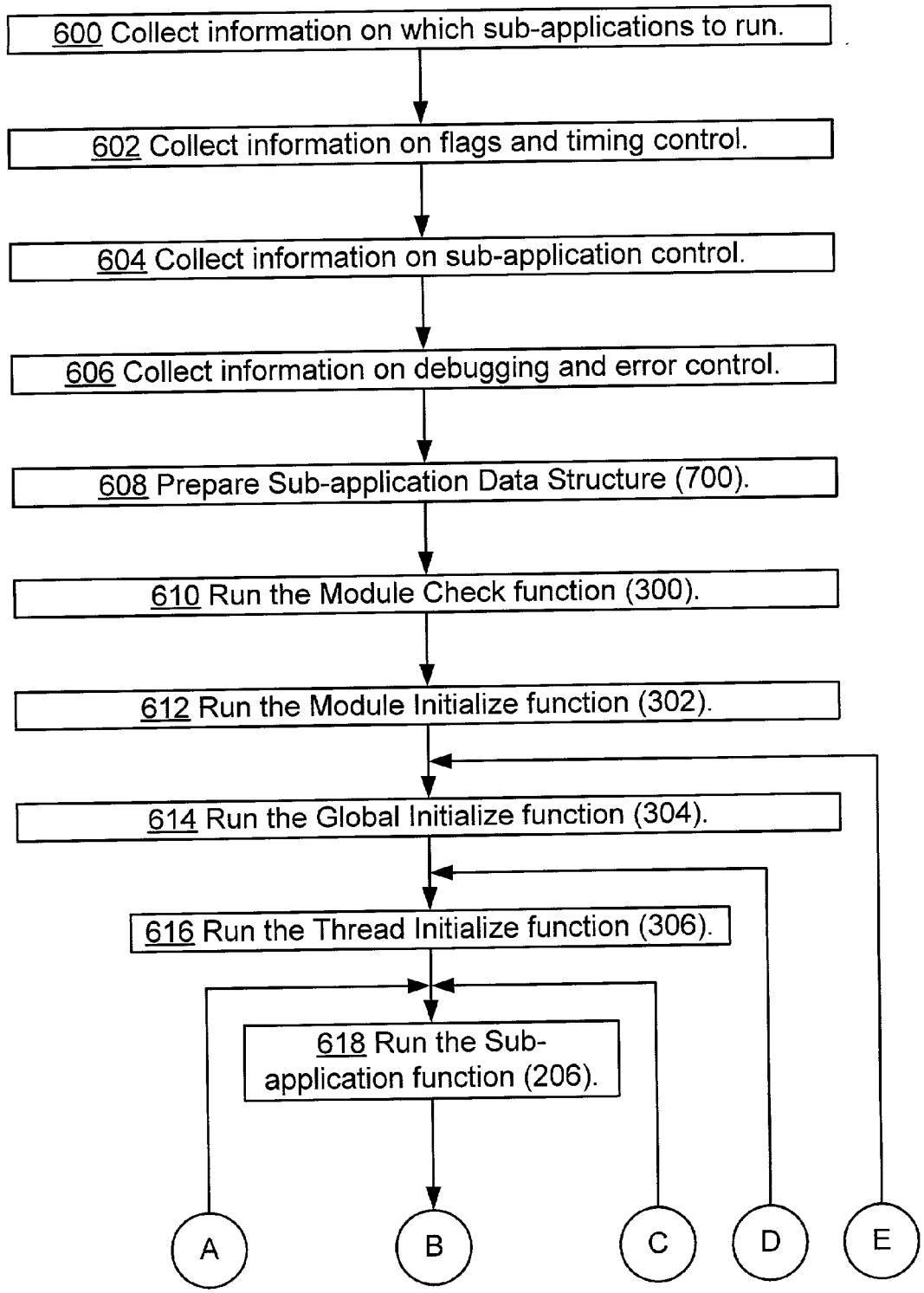
FIGS. 6a, 6b, 6c, and 6d are a flow chart showing how an exemplary engine can run the functions that make up an application.
Figure 6B:
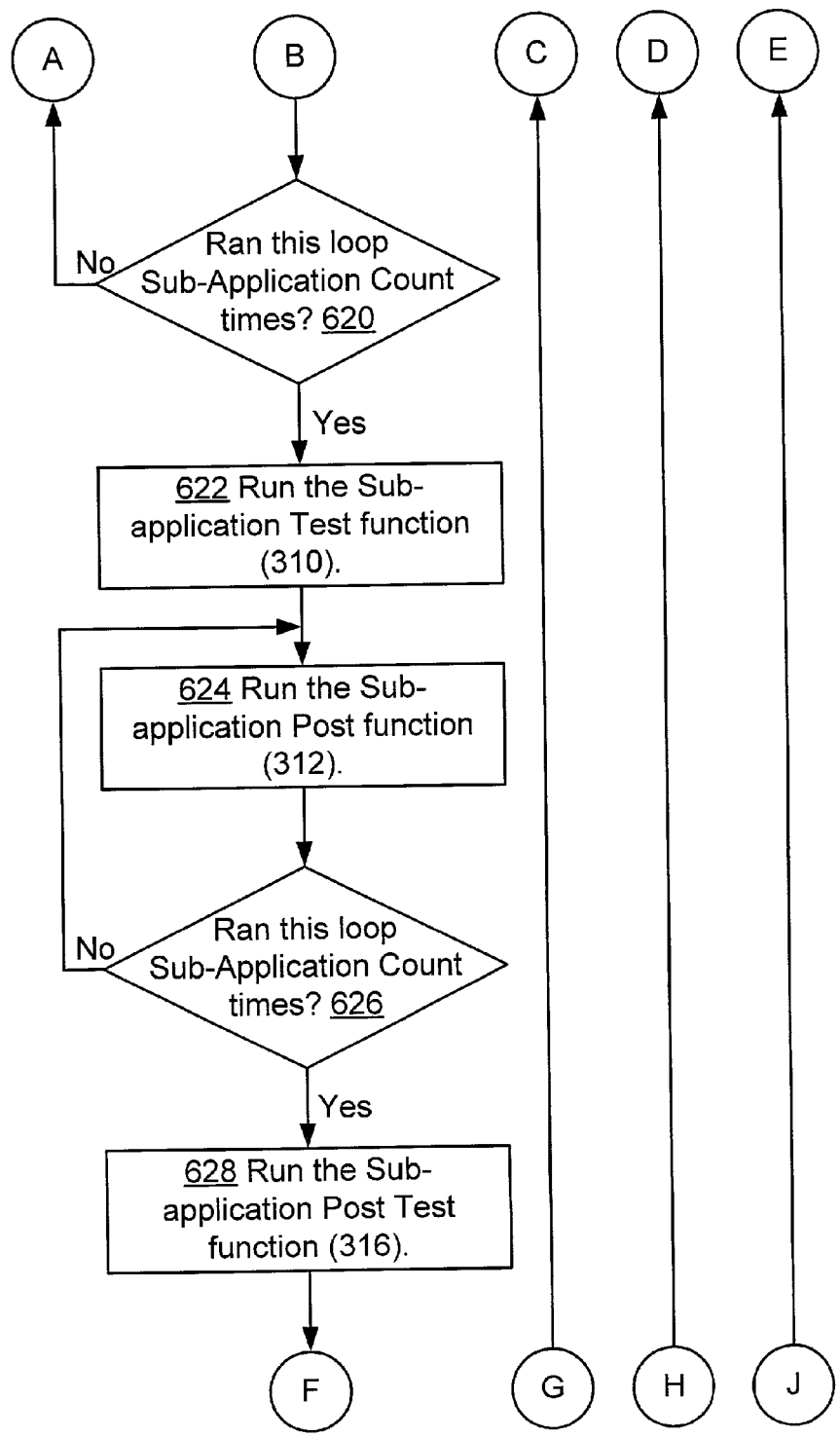
Figure 6C:
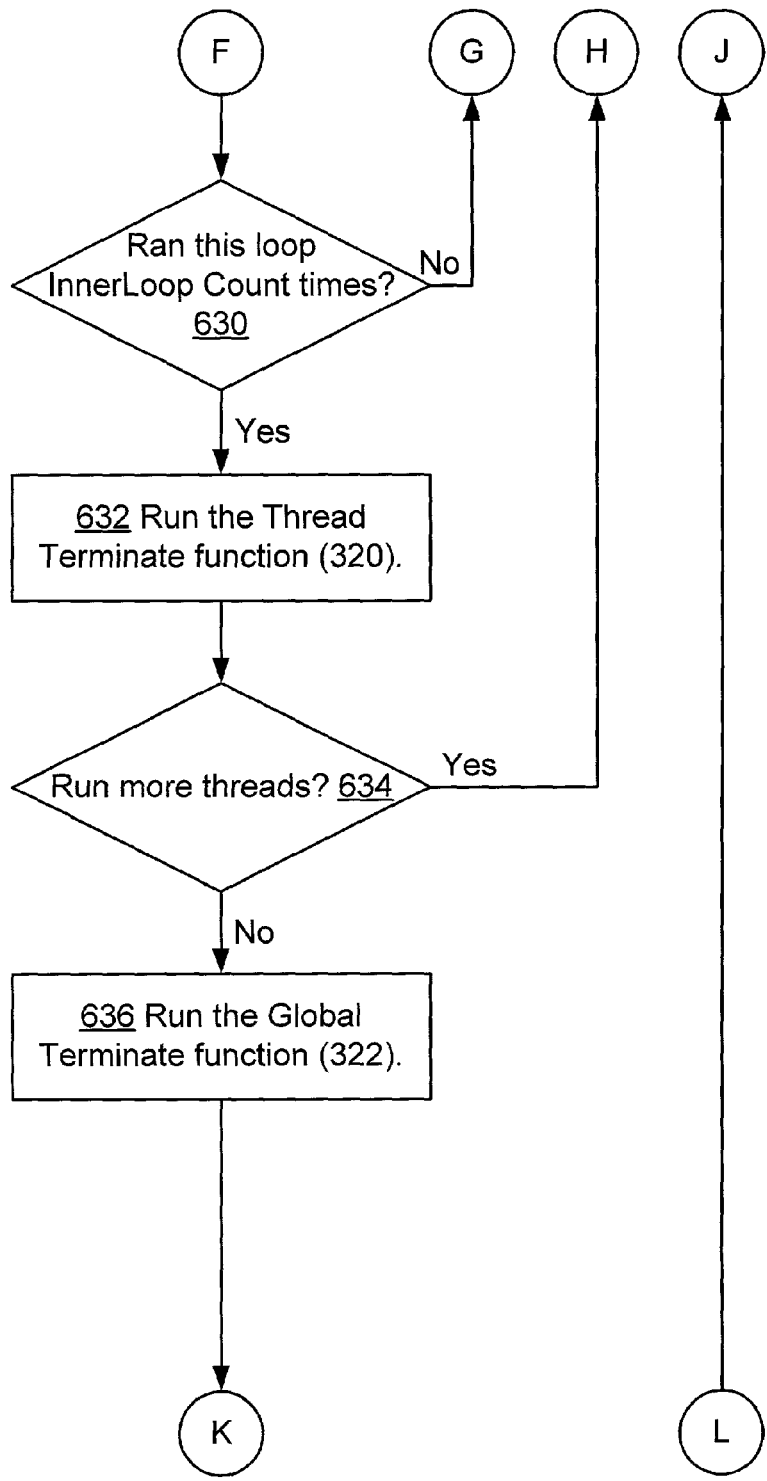

FIGS. 6a, 6b, 6c, and 6d show how the framework data structures 202 and framework functions come together when an application 204 is run. FIG. 6a also shows how parameter values are gathered that affect the operation of the engine 200 and the sub-applications 206.

In steps 600, 602, 604, and 606, a user asks to run an application 204 and sets parameters for the run. Note that these steps are separated for purposes of this discussion: in some embodiments, all parameters are set in one step. In step 600, the user specifies which sub-applications 206 to run. For example, the command:

SPfail -test:Crash -!test:Restart runs the Crash sub-application of the SPfail application but prevents the Restart sub-application from running. (The keyword "test" is used to specify a sub-application for historical reasons.)

In step 602, the user sets flags for the sub-applications 206 to be run. The format is:

SPfail -param:<sub-application name or all> <parameter name> so that the command:

SPfail -param:Crash mint 10 sets the minimum wait time (part of the timers field 444) before calling the Crash sub-application to ten seconds. Other timers and the flags in field 440 can also be set this way.

The user in step 604 sets sub-application control factors. Table 1 is an exemplary list of these factors. The descriptions in the Table are sufficient for most parameters so only a few are mentioned here. The loop counters specified in the command line are multiplied by the execution factors 442 to arrive at the actual number of times the loops are performed. When the application 204 is a test suite, the tests in it are often run over and over again to stress the application under test. This is done by setting the loop counters to high values. As a check on this, parameters can be set that terminate the run of the test suite when a maximum run time is reached or when a maximum number of sub-applications (test variations) have been run. By setting the logging level, the user controls the level of detail in the reported results. An example command setting some of these parameters is:

SPfail -test:Crash -MRT:1200 -MS:50 -log:spfail.log -LL:7 -threads:3

The sub-application Crash of application SPfail is run 50 times or for 1200 seconds (whichever comes first). Results are logged at a "World" level to the file spfail.log. During the run, the number of threads executing is limited to three.

TABLE 1

| Parameter (Abbreviation) | Description |
| --- | --- |
| Maximum Run Time (MRT) | Exit after running for MRT seconds. |
| Seed | Set the seed for a random number generator. |
| Maximum Sub-applications (MS) | Exit after running the sub-application MS number of times. |
| Server | Log the results to this server. |
| Dynamic Link Library (DLL) | Load this library for the run. |
| Log | Log the results to this file. |
| Logging Level (LL) | Specify the level of detail to put into the log: 1 = stress; 2 = error; 3 = warnings; 4 = default; 5 = details; 6 = entry; 7 = world. |
| Loop Count (LC) | Run through everything this many times. |
| Inner Loop Count (ILC) | Run the loop controlled by box 630 this many times. |
| Sub-application Count (SC) | Run the loops controlled by boxes 620 and 626 this many times. |

TABLE 1-continued

| Parameter (Abbreviation) | Description |
| --- | --- |
| ID | The user tags this process with a unique numeric identifier. (This number is unrelated to the process ID given to processes by the operating system 212.) |
| Threads | This is the default number of threads to run. |
| Cluster Name | Run the application in this cluster. |

Step 606 allows the user to specify debugging and error control information. Table 2 lists some of the possibilities here. These concepts are familiar in the industry, but putting this functionality into the framework produces the advantage of relieving the developer from having to implement these controls in each application.

TABLE 2

| Parameter (Abbreviation) | Description |
| --- | --- |
| Debug Break (DB) | Break into the debuggers: 2 = break only for the computer on which the sub-application is running; 3 = break for all nodes of the cluster and client. |
| Fatal Errors | Do a forced exit when one of these errors is encountered. |
| Included Debug Errors (IDE) | Perform a debug action when one of these errors is encountered. |
| Break Action (BA) | Perform these debug actions (ORed together): 1 = exit after the sub-application runs; 2 = exit if the sub-application fails (default); 4 = exit without cleaning up; 8 = return true error value rather than returning 777; 16 = exit by terminating all separate threads when sequential sub-applications are complete. |
| Catch Unhandled Exceptions | Yes or no. |

The engine in step 608 uses the information gathered in the previous steps and information stored in the framework data structures 202 to create the sub-application data structure 700 for this run. That data structure is discussed with reference to FIGS. 7a and 7b.

Figure 6D:
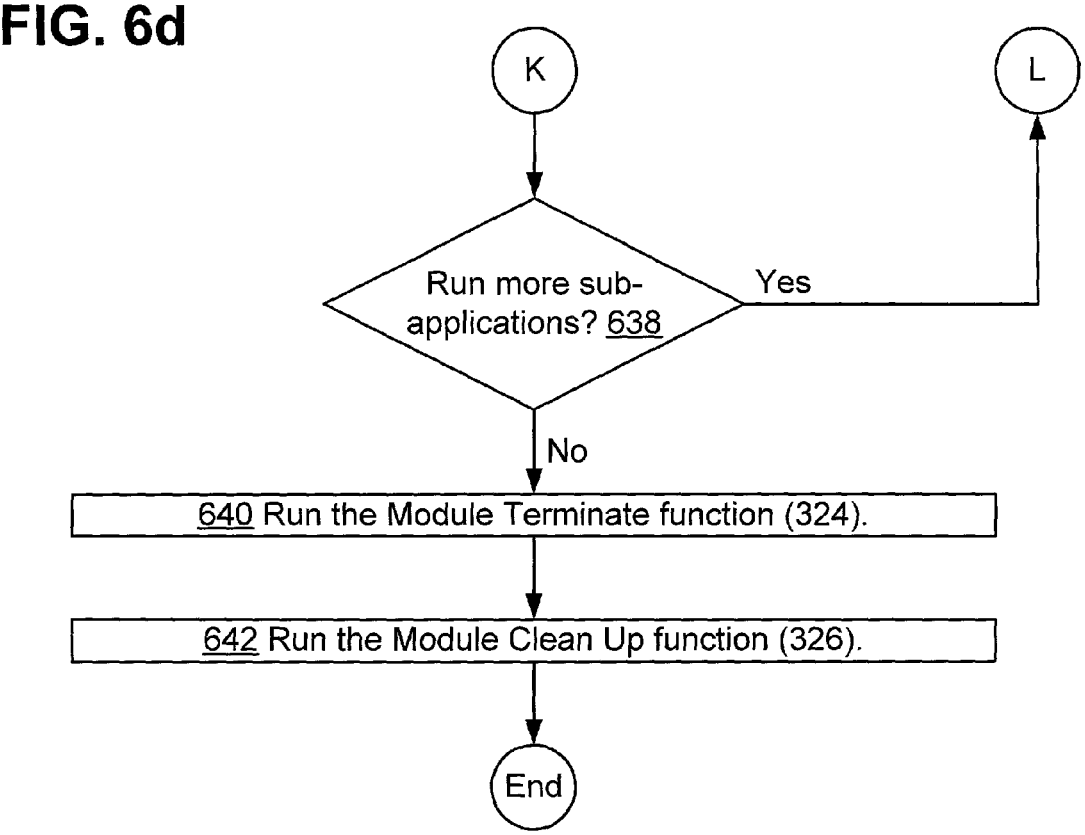

Step 610 through the End on FIG. 6d is a straightforward procedure for running the framework functions discussed with reference to FIGS. 3a and 3b. As mentioned in reference to those Figures, threads within a sub-application and separate sub-applications may be run consecutively or concurrently. The loops controlled by boxes 634 and 638 are not meant to imply the necessity of purely sequential operation.

A pointer to the sub-application data structure 700 of FIG. 7a is passed as the input argument to the framework functions. The first member of the structure, lpGlobalData 702, points to the global data class 716 portrayed in FIG. 7b. Fields 704 and 706 are used by the framework functions to pass data among themselves. The szPrefix field 708 is a string that uniquely identifies a thread. Its particular value is not important; in one embodiment, it is formed from a concatenation of the number of the thread with the name of the sub-application 434. The dwIndex field 710 is the number of the thread. Field 712, dwCurrentInnerLoopCount, keeps track of the number of times that the loop controlled by box 630 has been executed, while field 714, dwCurrentSub-applicationCount, does the same for the loops controlled by boxes 620 and 626.

The global data class 716 of FIG. 7b is a collection of useful values. As their names indicate, several of these fields store values set in steps 602, 604, and 606 of FIG. 6a. Field 720, bClean, indicates whether the clean up function 326 should be called at the end of the application's run. If field 722, bCheck, is set to True, then the module check function 300 is run without running any of the sub-applications 206. Field 724, bPerf, tells the engine to check for memory leaks.

III. A Detailed Example: The IOHammer Test Suite

The concepts presented above may be more easily grasped in the context of a concrete example. In this section, a straightforward test suite, called "IOHammer," is presented. IOHammer stresses a computer's hard disk by quickly writing to it. IOHammer is presented in terms of its framework data structures 202 and its framework functions. FIG. 8, a variation on FIGS. 3a and 3b, shows how the framework functions fit together. While IOHammer as presented is written for Microsoft's "WINDOWS" operating system, the present invention is not restricted to any particular operating environment. Note that IOHammer is presented purely as an example for explaining the concepts presented above, and no guarantees are made as to its completeness or utility.

Beginning with the framework data structures 202, the following is the module table 400. The module table has NULLs for some of the framework functions: module clean up 326, module check 300, print usage 410, and process arguments 412. In keeping with the flexibility offered by the framework, these functions may be defined if they are useful, or, as in the simple case presented here, left undefined at the application developer's discretion.

```
//
// IOHammer Module Table (400): This points to the other
tables.
//
WTTMODULETABLE IOHammerMasterEntry =
{
    _TEXT("1.0.001"),                    // 402
    _TEXT("IOHammer"),                   // 404
    _TEXT("IOHammer Master Entry"),      // 406
    _TEXT(""),                           // 408
    NULL,                                // 326
    NULL,                                // 300
    NULL,                                // 410
    NULL,                                // 412
    IOHammerInitialize,                  // 800
    IOHammerTerminate,                   // 812
    IOHammerParameterTable,              // 210
    IOHammerApplicationTable,            // 208
};
```

The IOHammer test suite is defined to take two parameters. As seen from the following parameter table 210, one parameter is the size of a write buffer and the other is the disk drive that IOHammer will exercise. If no disk drive is set, then IOHammer will exercise all accessible disk drives.

```
//
// IOHammer Parameter Table (210) with two entries.
//
static WTTPARAMETERTABLE
IOHammerParameterTable[] =
{
    {                                                      // 418
        _TEXT("size"),                                     // 420
        _TEXT("Size of buffer in terms of # volume sectors"), // 422
        0,                                                 // 424
        WTT_DWORD,                                         // 426
        (LPVOID) &dwSectorsPerBuffer,                      // 428
        NULL                                               // 430
    },
    {                                                      // 418
        _TEXT("drive"),                                    // 420
        _TEXT("The drive to run on. Must have a \\"),      // 422
        0,                                                 // 424
        WTT_PSTRING,                                       // 426
        (LPVOID) &pszDriveLetter,                          // 428
        NULL                                               // 430
    }
};
```

The IOHammer test suite has only one sub-application, so its application table 208 has only one entry 432. As is often the case, the execution factors 442 are all set to one. As in the module table 400, some functions are not defined: global initialize 304, global terminate 322, sub-application test 310, sub-application post 312, and sub-application post test 316.

```
//
// IOHammer Application Table (208) with only one entry.
//
static WTT_APPLICATION_ENTRY
IOHammerApplicationTable[] =
{
    {                                          // 432
        _TEXT("IOHammer"),                     // 434
        _TEXT("Hammer all disks with IOs"),    // 436
        _TEXT(""),                             // 438
        WTT_ENABLED,                           // 440
        1, 1, 1, 1,                            // 442
        NULL,                                  // 304
        NULL,                                  // 322
        IOHammerThreadInitialize,              // 802
        IOHammerThreadTerminate,               // 810
        IOHammerVariationWrite,                // 804
        NULL,                                  // 310
        NULL,                                  // 312
        NULL,                                  // 316
        NULL, NULL,                            // 444
        NULL                                   // 446
    }
};
```

As seen from FIG. 8, the first framework function to run is IOHammerInitialize 800. Because IOHammer is a simple test suite, this function incorporates the functionality of the framework functions module check 300 and module initialize 302. As only one sub-application is defined for this test suite, this function also incorporates the functionality of the global initialize function 304. IOHammerInitialize sets up a list of disk drives to exercise, allocates write buffers for the drives, and exits with an error if various initial conditions are not met.

```
//
// DESCRIPTION: IOHammerInitialize (800).
// This is the module initialize function, called at the start. It allocates and sets up the
// buffers for the reads and writes. All threads use the same write buffer and have
// separate read buffers.
//
// PARAMETERS:
// None.
//
// PRE-CONDITIONS:
// Called before the test (IOHammerVariationWrite 804) is run.
//
// POST-CONDITIONS:
// Memory is allocated and ready to do the test variation.
//
// RETURN VALUE:
// Status from WTTInitialize, VirtualAlloc, etc.
//
DWORD IOHammerInitialize( )
{
    // 26 drive letters plus a NULL for each plus a NULL at the end.
    TCHAR                       szDriveLetters[26 * 3 + 1];
    TCHAR                       *pszTmp;
    PTStringCollection::iterator itDrive;
    int                         iDriveIndex;
    // Exit with error if no cluster name is specified.
    if(!pWTTGlobalData->pszClusterName)
        WTTLOG_ERR_RETURN(ERROR_INVALID_PARAMETER);
    dwRet = WTTLogInitialize(NULL, NULL);
    if(dwRet == ERROR_SUCCESS)
    {
        // Hide the log unless WTTSHOWLOG is set in the environment.
        if(!MiscIsEnvVarSet(_TEXT("WTTSHOWLOG")))
            pWTTGlobalData->dwLogFlags &= ~(TLS_WINDOW |
                TLS_MONITOR);
        dwRet = WTTInitialize(NULL);
    }
    LOG_SETLEVEL(0);
    //
    // If a drive has been specified, use it. Else, use all drives that can be seen and
    // that are appropriate.
    //
    if(pszDriveLetter != NULL)
    {
        // Use the specified drive. Double NULL-terminate the string!
        _tcscpy(szDriveLetters, pszDriveLetter);
        szDriveLetters[_tcslen(szDriveLetters) + 1] =_T('\0');
    }
    else
    {
        // Use all available drives.
        DWORD dwCount =
            GetLogicalDriveStrings(ARRAY_LENGTH(szDriveLetters),
                szDriveLetters);
        // Exit with error if no drives are available.
        if(dwCount == 0)
        {
            dwRet = GetLastError( );
            goto ret;
        }
    }
    // Make a comma-separated list of drives.
    int                         len;
    pszTmp = szDriveLetters;
    while((len = _tcslen(pszTmp)) != 0)
    {
        pszTmp[len] = L',';
        pszTmp = &pszTmp[len + 1];
    }
    // Exit with error if no drives are found.
    if(_tcslen(szDriveLetters) == 0)
    {
        dwRet = ERROR_INVALID_PARAMETER;
        goto ret;
    }
    assert(szDriveLetters[_tcslen(szDriveLetters) -1 ] ==_T(','));
    szDriveLetters[_tcslen(szDriveLetters) -1 ] = _T('\0');
    MiscConvertToStringList(stlstDrives, szDriveLetters, L',');
    RemoveDrives(stlstDrives);
```

```
// Exit with error if no drives are found.
if(stlstDrives.size( ) == 0)
{
    dwRet = ERROR_INVALID_PARAMETER;
    goto ret;
}
(void)memset(aszWriteBuffs, 0, ARRAY_LENGTH(aszWriteBuffs));
(void)memset(aiWriteBuffSizes, 0, ARRAY_LENGTH(aiWriteBuffSizes));
// Get the sector size for each drive.
for(iDriveIndex = 0, itDrive = stlstDrives.begin( ); itDrive != stlstDrives.end( );
    itDrive++, iDriveIndex++)
{
    DWORD               dwSectorsPerCluster,
                        dwBytesPerSector,
                        dwNumberOfFreeClusters,
                        dwTotalNumberOfClusters;
    // Exit with error if cannot get sector size.
    if(!GetDiskFreeSpace(**itDrive, &dwSectorsPerCluster,
        &dwBytesPerSector, &dwNumberOfFreeClusters,
        &dwTotalNumberOfClusters))
    {
        dwRet = GetLastError( );
        goto ret;
    }
    // Allocate a buffer for this drive and store in global info. Then write to it.
    aszWriteBuffs[iDriveIndex] = (TCHAR *)VirtualAlloc(NULL,
        dwBytesPerSector * dwSectorsPerBuffer, MEM_RESERVE |
        MEM_COMMIT, PAGE_READWRITE);
    // Exit with error if cannot allocate buffer.
    if(aszWriteBuffs[iDriveIndex] == NULL)
    {
        dwRet = GetLastError( );
        goto ret;
    }
    // Write to the buffer.
    aiWriteBuffSizes[iDriveIndex] = dwBytesPerSector *
        dwSectorsPerBuffer;
    (void)memset(aszWriteBuffs[iDriveIndex], 'X',
        aiWriteBuffSizes[iDriveIndex])
}
ret:
}
```

For each thread that will be run, the IOHammerThreadInitialize function 802 sets up a write file on each disk drive that will be exercised.

```
//
// DESCRIPTION: IOHammerThreadInitialize (802).
//
// PARAMETERS:
// pData
//
DWORD IOHammerThreadInitialize(PWTT_VARIATION_
DATA pData)
{
    PTStringCollection::iterator  itDrive;
    HANDLE                        hFile;
    // Create the handles array and hang it off the pData.
    NULL-terminate it.
    HANDLE* phFiles = new HANDLE[stlstDrives.size( ) + 1];
    phFiles[stlstDrives.size( )] = NULL;
    pData->lpThreadData = phFiles;
    // Create a file for each drive.
    for(itDrive = stlstDrives.begin( ); itDrive != stlstDrives.end( );
        itDrive++)
    {
        // Build filename.
        TCHAR    szID[33];
        _stprintf(szID, _T("%p"), pWTTGlobalData->dwPID);
```

```
        TString stFileName = **itDrive + szID;
        stFileName += pData->szPrefix;
        stFileName += _T(".dat");
        *phFiles = CreateFile(stFileName, GENERIC_READ |
            GENERIC_WRITE, 0, NULL, CREATE_ALWAYS,
            FILE_ATTRIBUTE_NORMAL | FILE_FLAG_NO_
            BUFFERING,
            NULL);
        // Exit with error if cannot create file.
        if(!*phFiles)
        {
            dwRet = GetLastError( );
            break;
        }
        else
            phFiles++;
    }
}
```

The IOHammer test suite as presented here has only one sub-application. The IOHammerVariationWrite sub-application 804 writes to the files set up in the IOHammerThreadInitialize function 802, using the write buffers allocated in the IOHammerInitialize function 800.

```
//
// DESCRIPTION: IOHammerVariationWrite (804).
//
// PARAMETERS:
// pData
//
DWORD IOHammerVariationWrite(PWTT_VARIATION_
DATA pData)
{
    DWORD     dwNumberOfBytesWritten;
    int       iDriveIndex = 0;
    // Write the buffer to the file named according to this thread.
    HANDLE *phFiles = (HANDLE *)pData->lpThreadData;
    // Write from buffer to file.
    while(*phFiles)
    {
        // Exit with error if write to file fails.
        if(!WriteFile(*phFiles, aszWriteBuffs[iDriveIndex],
            aiWriteBuffSizes[iDriveIndex],
            &dwNumberOfBytesWritten,
            NULL))
        {
            dwRet = GetLastError( );
            break;
        }
        phFiles++;
    }
}
```

The IOHammerThreadTerminate function 810 cleans up by closing and deleting the files set up by the IOHammerThreadInitialize function 802.

```
//
// DESCRIPTION: IOHammerThreadTerminate (810).
//
// PARAMETERS:
// pData
//
DWORD IOHammerThreadTerminate(PWTT_VARIATION_
DATA pData)
{
    PTStringCollection::iterator    itDrive;
    // First close the files. The handles are in the user data.
    HANDLE *phFiles = (HANDLE *)pData->lpThreadData;
    while(*phFiles)
    {
        // Exit with error if cannot close a file.
        if(!CloseHandle(*phFiles))
        {
            dwRet = GetLastError( );
            goto ret;
        }
        phFiles++;
    }
    // Now delete file for each drive.
    for(itDrive = stlstDrives.begin( ); itDrive != stlstDrives.end( );
        itDrive++)
    {
        TCHAR     szID[33];
        // Build filename.
        _stprintf(szID, _T("%p"), pWTTGlobalData->dwPID);
        TString stFileName = **itDrive + szID;
        stFileName += pData->szPrefix;
        stFileName += _T(".dat");
        // Exit with error if cannot delete file.
        if(!DeleteFile(stFileName))
        {
            dwRet = GetLastError( );
            break;
        }
    }
    ret:
}
```

The IOHammerTerminate function 812 incorporates the functionality of the global terminate 322, module terminate 324, and module clean up 326 functions. It frees the write buffers allocated by the IOHammerInitialize function 800.

```
//
// DESCRIPTION: IOHammerTerminate (812).
//
// PARAMETERS:
// None.
//
DWORD IOHammerTerminate( )
{
    PTStringCollection::iterator    itDrive;
    for(int iDriveIndex = 0; iDriveIndex < stlstDrives.size( );
        iDriveIndex++)
    {
        // Exit with error if cannot free a write buffer.
        if(!VirtualFree(aszWriteBuffs[iDriveIndex],
            aiWriteBuffSizes[iDriveIndex], MEM_DECOMMIT))
        {
            dwRet = GetLastError( );
            break;
        }
    }
    // Erase the drive list.
    stlstDrives.DeleteAll( );
}
```

It can be appreciated from this example that for applications much more complicated than IOHammer, the framework itself does not become more complicated. The framework may incorporate more parameters, and more of the framework functions may be defined, but the framework substantially separates issues of the application's run-time environment from issues of the application's core functionality.

In view of the many possible embodiments to which the principles of this invention may be applied, it should be recognized that the embodiments described herein with respect to the drawing figures are meant to be illustrative only and should not be taken as limiting the scope of invention. Therefore, the invention as described herein contemplates all such embodiments as may come within the scope of the following claims and equivalents thereof.

We claim:

1. A computer-implemented method for running an application using a single framework module including a framework data structure, the framework data structure including an application table and a parameter table, the application table including application table entries, the parameter table including parameter table entries, the method comprising:

(a) selecting an application table entry;
    (b) collecting data specifying a type of error;
    (c) collecting data specifying a sub-application referenced by the selected application table entry;
    (d) collecting data specifying an error response action; and
    (e) processing the selected application table entry, the processing comprising:
        (i) running a global initialize function referenced by the selected application table entry, the global initialize function operable to initialize a plurality of threads of the sub-application;

(ii) running the sub-application referenced by the selected application table entry with one or more parameters referenced by one or more parameter table entries;

(iii) if the application table entry being processed references the specified sub-application, and if the specified sub-application generates an error of the specified type, performing the specified error response action; and (iv) running a global terminate function referenced by the selected application table entry, the global terminate function operable to terminate the plurality of threads of the sub-application.

2. The computer-implemented method of claim 1 wherein at least one of the global initialize and the global terminate functions is a NULL function.

3. The computer-implemented method of claim 1 further comprising:

running a module initialize function referenced by the framework module; and running a module terminate function referenced by the framework module.

4. The computer-implemented method of claim 1 wherein running the sub-application comprises:

(a) accessing from the selected application table entry a number of threads to run; and (b) for each of the number of threads to run:
(i) running a thread initialize function referenced by the selected application table entry;
(ii) running the sub-application, and
(iii) running a thread terminate function referenced by the selected application table entry.

5. The computer-implemented method of claim 1 further comprising:

selecting each application table entry in the application table; and processing each selected application table entry.

6. The computer-implemented method of claim 1 further comprising:

collecting data specifying that a sub-application should not be run; and wherein selecting the application table entry comprises selecting an application table entry other than one that references the specified sub-application.

7. The computer-implemented method of claim 1 further comprising:

collecting data specifying a value of a parameter;

collecting data specifying a sub-application; and wherein processing the selected application table entry further comprises:
if the application table entry being processed references the specified sub-application, then using the specified value of the parameter.

8. The computer-implemented method of claim 1 wherein the error response action is in the set: break into a debugger, exit without clean up; terminate all threads; exit immediately.

9. A computer-readable storage medium having instructions for performing the method of claim 1.

10. A computing system including a processing unit and memory for running an application using a single framework module including a framework data structure, the framework data structure including an application table and a parameter table, the application table including application table entries, the parameter table including parameter table entries, the memory storing instructions that, when executed by the processing unit, cause the processing unit to:

(a) select an application table entry;

(b) collect data specifying a type of error;

(c) collect data specifying a sub-application referenced by the selected application table entry;

(d) collect data specifying an error response action; and (e) process the selected application table entry, the processing comprising:

(i) running a global initialize function referenced by the selected application table entry, the global initialize function operable to initialize a plurality of threads of the sub-application;

(ii) running the sub-application referenced by the selected application table entry with one or more parameters referenced by one or more parameter table entries;

(iii) if the application table entry being processed references the specified sub-application, and if the specified sub-application generates an error of the specified type, then performing the specified error response action; and (iv) running a global terminate function referenced by the selected application table entry, the global terminate function operable to terminate the plurality of threads of the sub-application referenced by the selected application table entry.

11. The computing system of claim 10 wherein at least one of the global initialize and the global terminate functions is a NULL function.

12. The computing system of claim 10 wherein the instructions stored in the memory when executed by the processing unit cause the processing unit to:

run a module initialize function referenced by the framework module; and run a module terminate function referenced by the framework module.

13. The computing system of claim 10 wherein running the sub-application comprises:

(a) accessing from the selected application table entry a number of threads to run; and (b) for each of the number of threads to run:
(i) running a thread initialize function referenced by the selected application table entry;
(ii) running the sub-application, and
(iii) running a thread terminate function referenced by the selected application table entry.

14. The computing system of claim 10 wherein the instructions stored in the memory when executed by the processing unit cause the processing unit to:

select each application table entry in the application table; and process each selected application table entry.

15. The computing system of claim 10 wherein the instructions stored in the memory when executed by the processing unit cause the processing unit to:

collect data specifying that a sub-application should not be run; and wherein selecting the application table entry comprises selecting an application table entry other than one that references the specified sub-application.

16. The computer-implemented method of claim 10 wherein the instructions stored in the memory when executed by the processing unit cause the processing unit to:

collect data specifying a value of a parameter;

collect data specifying a sub-application; and wherein processing the selected application table entry further comprises:

if the application table entry being processed references the specified sub-application, then using the specified value of the parameter.

17. The computing system of claim 10 wherein the error response action is in the set: break into a debugger, exit without clean up; terminate all threads; exit immediately.

* * * * *